United States Patent [19]

Chenausky et al.

[11] 3,950,712

[45] Apr. 13, 1976

[54] UNSTABLE LASER RESONATOR HAVING RADIAL PROPAGATION

[75] Inventors: Peter P. Chenausky; Anthony J. DeMaria, both of West Hartford; David W. Fradin, Manchester; Robert J. Freiberg, South Windsor, all of Conn.

[73] Assignee: United Technologies Corporation, Hartford, Conn.

[22] Filed: Apr. 14, 1975

[21] Appl. No.: 568,083

[52] U.S. Cl. ............................. 331/94.5 C; 350/299
[51] Int. Cl.² ......................................... H01S 3/081
[58] Field of Search ................... 331/94.5; 356/112; 350/294, 299

[56] References Cited
UNITED STATES PATENTS

| | | | |
|---|---|---|---|
| 3,241,085 | 3/1966 | Marcatili | 331/94.5 C |
| 3,454,897 | 7/1969 | Strauss | 331/94.5 C |
| 3,739,296 | 6/1973 | Beiser | 331/94.5 C |

OTHER PUBLICATIONS

Casperson, Properties of a Radial Mode $CO_2$ Laser, IEEE J. Quant. Elect. Vol. QE9, No. 4, (Apr., 1973), pp. 484–488.

Primary Examiner—William L. Sikes
Attorney, Agent, or Firm—Anthony J. Criso

[57] ABSTRACT

A new resonator concept which is especially useful in chemical laser applications is disclosed. A ring end mirror, a conical folding mirror and a circular end mirror are combined to form an unstable resonator including a radial direction propagation having a gain medium region and a region of axial direction propagation. Alternate embodiments of the invention include the use of nonreflective fins in the region containing the working medium to suppress superfluorescence and an aerodynamic window to keep depleted working medium out of the path of the resonant beam.

8 Claims, 4 Drawing Figures

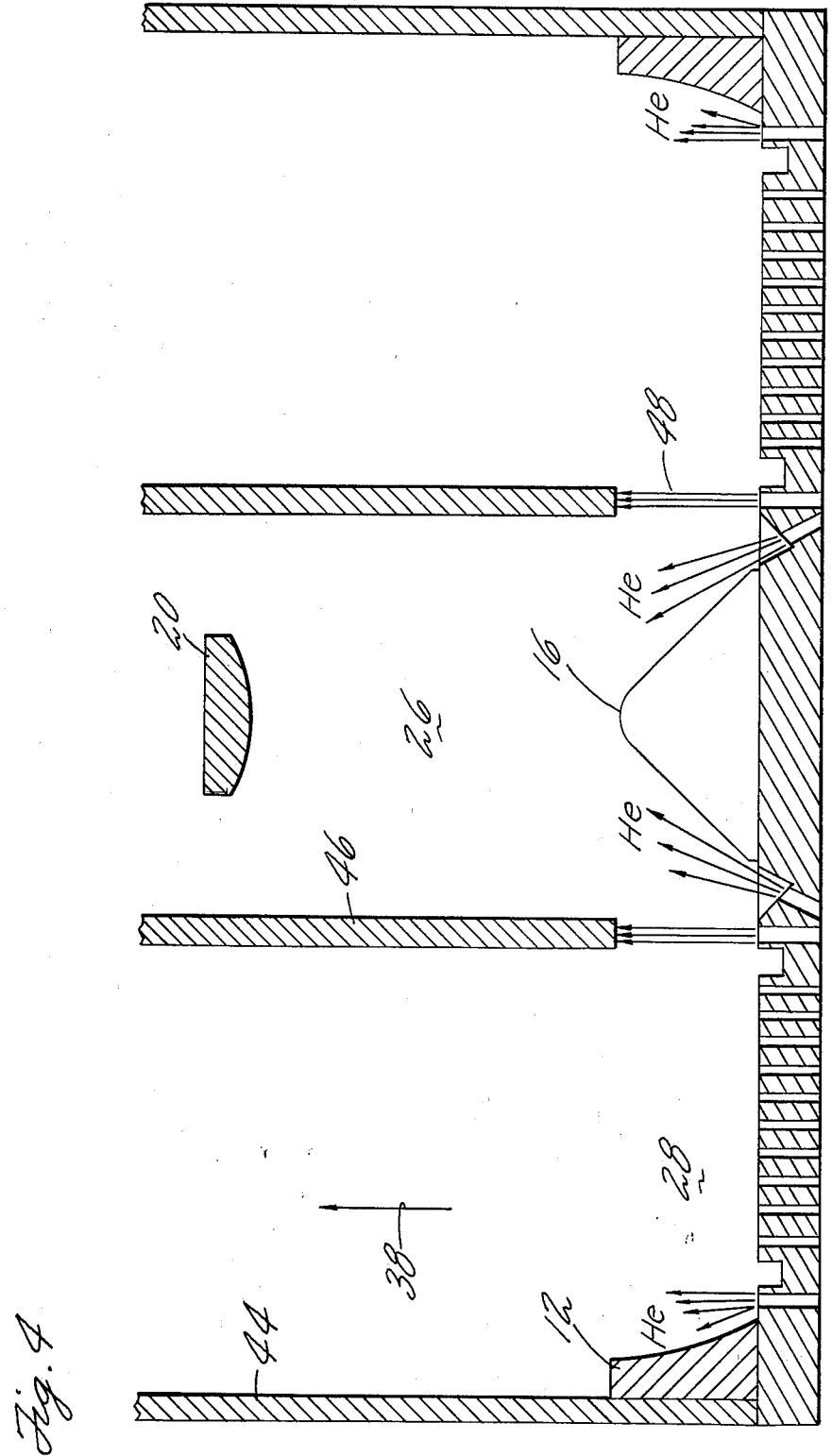

UNSTABLE LASER RESONATOR HAVING RADIAL PROPAGATION

BACKGROUND OF THE INVENTION

1. Field of the Invention

The present invention relates to resonators and more particularly to unstable laser resonators especially adaptable to high power chemical laser applications.

2. Description of the Prior Art

Chemical lasers have been recognized as suitable devices for providing laser radiation at high levels of power. The amount of power producible by such means is directly related to the volume of gain medium which can be controlled. Various previous attempts to increase the amount of power in the output beam from a chemical laser simply involved increasing the volume of the active gain medium. As the demand for power continues to increase, the ability to increase the power level from the conventional laser systems by increasing the dimensions associated with the volume of the active medium reaches a predictable limit due to a natural phenomenon known as superfluorescence. As used herein, superfluorescence means the phenomenon in which oscillations can be initiated from spontaneous emission and sustained without the benefit of positive optical feedback structure such as the reflecting surfaces of mirrors in a resonator. In effect, should the maximum dimension in any direction through a gain medium having a population inversion exceed some critical dimension dictated by superfluorescence, spontaneous emissions in the gain medium cause an uncontrolled depopulating of the medium resulting in random bursts of energy in random directions and reduction in the power level of the output beam. Therefore, some conceptually different apparatus arrangement are required if the usable power extractable from such devices is to be increased.

One modification to conventional resonator design which allows a large volume of gain medium in the shape of a disc in the resonator is taught by Casperson as disclosed in "Properties of Radial Mode $CO_2$ Laser," IEEE Journal of Quantum Electronics, Vol. QE-9, No. 4, Apr. 1973, pages 484–488. The stable resonator design shown in FIG. 1 of this article can be adapted to various laser systems having high gain to provide an increased volume of gain medium without incurring superradiance, however, the beam of output energy from such a resonator is of poor optical quality for many potential applications because large volume stable resonators tend to oscillate on higher order transverse modes and to exhibit poor transverse mode discrimination.

A practical resonator design which permits a very large volume of gain medium without sacrificing transverse mode discrimination is taught in U.S. Pat. (application Ser. No. 533,376) entitled Unstable Split Mode Laser Resonator, filed on Dec. 16, 1974 and held with the present invention by common assignee. In the split mode resonator, two separate active gain regions are interconnected with a common folding mirror and a common coupling mirror to produce an output beam having a power which is essentially twice the maximum power which was previously available. This split mode concept is a useful teaching, however, it also has shortcomings. For example, some applications have a requirement for a laser beam at a power level even higher than is possible with the split mode teaching. Also, the split mode resonator has a power distribution in the far field which is somewhat of a departure from strict diffraction limited characteristics.

SUMMARY OF THE INVENTION

A primary object of the present invention is to provide a high power beam of laser radiation with diffraction limited optical qualities in the far field.

According to the present invention, an unstable resonator geometry is formed with an annular mirror, a conical mirror and a circular mirror with the conical and circular mirrors being disposed symmetrically about an optical axis passing through the center of each of these mirrors and the annular mirror disposed concentrically about the axis to allow a flow of gaseous working medium between the toroidal and conical mirrors in the axial direction; the resonator is capable of providing an output beam having an annular cross section through a split mode condition of resonant operation which includes a cylindrical mode propagating axially between the reflective surfaces of the circular and conical mirrors, and a radial mode propagating nonaxially between the reflective surfaces of the conical and annular mirrors, the radial mode having a plane of symmetry coincident with that boundary of the operating mode which strikes the conical mirror nearest to the cone apex.

In a preferred embodiment of the present invention, the active gain region in the resonant circuit is formed into an annular disc configuration which is azimuthally symmetrical about the optical axis of the resonator. The maximum dimension associated with the annular gain medium is determined by the limits of superfluorescence. The resonator includes a circular end mirror, a toroidal end mirror, and a conical folding mirror forming an intracavity mode which resonates along a path extending in all three spatial directions; the mode propagates linearly along the optical axis between the circular and folding mirrors, and symmetrically in all directions radially with respect to the optical axis between the folding and toroidal annular mirrors. The system provides an output beam which is circular in cross section and has a diameter which is essentially equal to twice the extraction length characteristic of the working medium. Further, the energy extracted by the radially propagating portion of the mode has an approximately uniform distribution in the output beam as a result of the reflective surface area of the conical folding mirror and the spatial variation of the gain in the flow direction of the working medium; the light intensity in the gain region decreases with an increase in the perpendicular distance from the plane at which the gain medium originates. In some embodiments, radial fins having a nonreflective surface extend between the folding and toroidal mirrors in the radially extending portion of the resonator.

The optical flux is distributed over a relatively large surface area near the base of the conical mirror in the vicinity of the origination plane of the gain medium or simply the nozzle exit plane, where the optical gain and light intensity are highest, and is distributed over a relatively small surface area of the conical mirror at the location furthest from the nozzle exit plane where the gain and intensity are lowest. This flux distribution tends to compensate for the spatial gain variation inherent in many chemical lasers and results in a fairly uniform distribution of radiant flux over the entire surface of the conical folding mirror. The output beam from the resonator is in the form of an azimuthally symmetric annulus which exhibits radial symmetry in both the phase and intensity about a central axis in the near field. As a result of the diffractive crosscoupling in the axially propagating section of the resonator, the near field beam is spatially coherent across its dimensions. Thus, the output radiation has a good far field beam quality approaching near diffraction limited characteristics. One of the primary advantages of the present invention is that the toric resonator design makes possible the production of laser radiation at a power level which can be more than an order of magnitude higher than that available from the chemical laser systems currently available. Also, the output beam has near diffraction limited optical characteristics in the form of a symmetric annulus which is amenable to relatively inexpensive spherical optics for optical processing.

The foregoing and other objects, features and advantages of the present invention will become more apparent in the light of the following detailed description of preferred embodiments thereof as discussed and illustrated in the accompanying drawing.

BRIEF DESCRIPTION OF THE DRAWING

FIG. 4 is a simplified cross sectional view through an alternate embodiment using an aerodynamic window to control the flow of the working medium.

DESCRIPTION OF PREFERRED EMBODIMENTS

Figure 1:
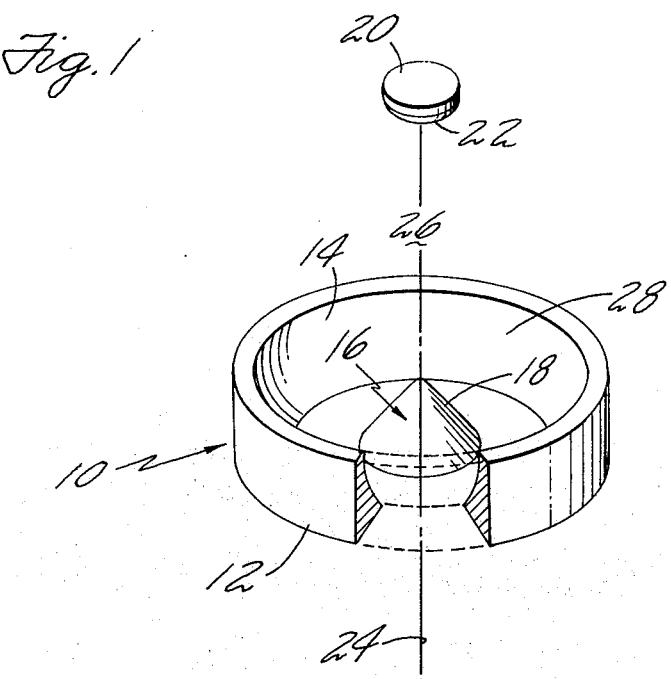
FIG. 1 is a simplified perspective view showing a toroidal end mirror, a conical folding mirror and a circular end mirror in accordance with the present invention.

An unstable resonator configuration 10 in accordance with the present invention is shown in FIG. 1. The basic resonator consists of an end mirror 12 which is a ring having a concave reflecting surface 14, a folding mirror 16 which is a cone having a conical reflecting surface 18 and a circular end mirror 20 having a convex reflecting surface 22. The circular and folding mirrors are symmetrically disposed about an optical axis 24 and form an axial region 26 of the resonator. In this axial region the mode propagates along the optical axis in the form of a cylinder symmetric about the optical axis and circular in cross section. Similarly, the ring or toroidal end mirror and the folding mirror form s nonaxial region 28 of the resonator. In the nonaxial region 28, the mode propagates in a plane which is perpendicular to the optical axis and in a pattern which is symmetric about this axis.

The basic resonator structure described above is shown in FIG. 2 with an annular coupling mirror 30 having an annular reflective surface 32 and a nozzle array 34. Also shown is a ray trace of some of the more significant optical paths through the resonator which contribute to the production of an annular output beam 36 having an outer diameter $d_O$ and an inner diameter $d_i$.

In the operation of this apparatus, a suitable gain medium is expanded across the nozzle array traveling in a flow direction 38 which is essentially parallel to the axis 24 to set up a condition of resonance between the convex end mirror 20 and the concave toroidal end mirror 12. In the axial region of the resonator, the outer portion of the circular resonant mode having a maximum diameter $d_O$ and traveling in the flow direction is stripped from the inner portion of the beam which has a maximum diameter $d_i$ by the coupling mirror to produce the annular output beam. In the region 26, a coherent beam which is uniform in phase and circular in cross section propagates along the axis. Upon striking the conical surface 18, the beam is transformed from a beam circular in cross section and traveling along the axis 24 in an upstream direction 40 to a radially expanding beam which propagates uniformly outward away from the axis 24. For the embodiment shown in FIG. 2, the non-axial region of propagation in the resonator forms a disc perpendicular to the axis 26 although this orientation is not required. The radially propagating portion of the beam is redirected by the concave surface 14 back toward the folding mirror 16. This reflected radiation which is collimated throughout the region 28 strikes the conical surface 18 and is redirected toward the convex mirror surface 22 propagating parallel to the axis 24. In the axial region immediately adjacent to the optical axis 26, the portions of the axially propagating beam are diffractively interlocked resulting in uniform phase coherence across the entire beam.

Figure 2:
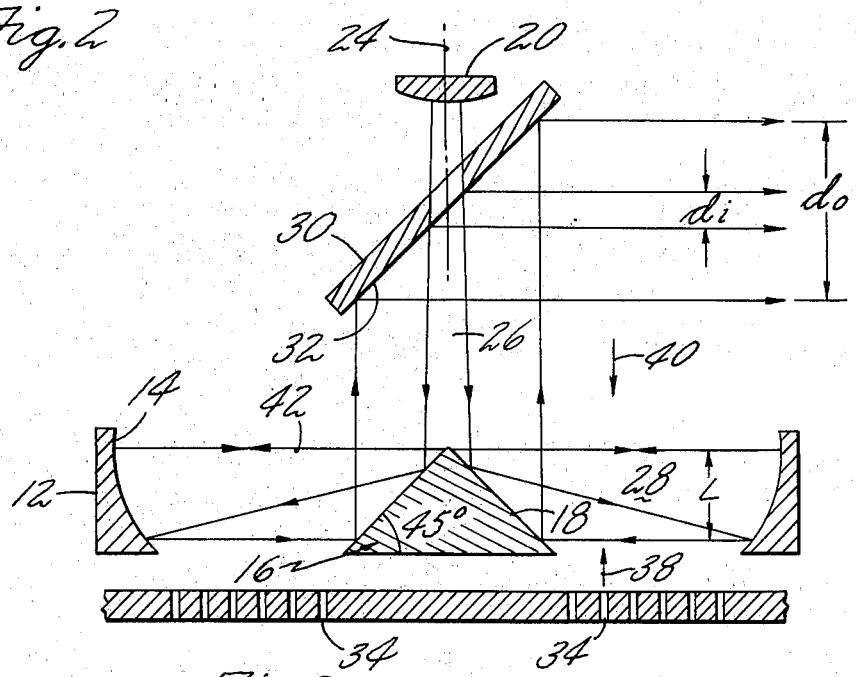
FIG. 2 is a simplified cross sectional view through an embodiment such as the one shown in FIG. 1 and additionally including an annular coupler mirror and a nozzle array.

Theoretically, the output power from the unstable resonator, shown in FIGS. 1 and 2 can be made infinitely large simply by increasing the diameter of the toroidal end mirror. The conditions imposed by superfluorescence which is always a consideration can be accommodated by increasing the inside diameter of the annular volume of the working medium. Referring to FIG. 2, the maximum dimension associated with the usable portion of the gain medium in the flow direction 38 is the extraction length L which is equal to essentially half the maximum width $d_O$ of the output beam. By arranging the active medium in an annulus, the total volume of gain medium which can be accommodated can be made considerably larger than that in a conventional resonator and since the output power is proportional to the volume of the gain medium, the system power can be increased accordingly.

In the nonaxial region 28, the intracavity mode propagates radially and perpendicular to the direction of flow 38. As the radially propagating mode collapses inwardly on the folding mirror, the radiation is deflected into the axial region 26 toward the circular end mirror and propagates along the optical axis 24 as a cylindrical beam. The axially propagating beam is formed by the folding mirror which is conical and so this portion of the beam has a circular cross section with a diameter $d_O$ which is essentially twice the extraction length L.

The diffractive crosscoupling within the axial region of the resonator provides a uniform phase characteristic in the output beam. This crosscoupling transforms the radially propagating portion of the intracavity flux into an axially propagating beam, all portions of which are in phase coherence with one another. The actual diffractive crosscoupling occurs in the immediate vicinity of the optical axis 24 which is the diffraction dominated portion of the resonator establishing the phase coherence of the overall beam. The axial intensity of the flux near the apex of the folding mirror 16 is somewhat reduced due to rounding of the apex.

In the embodiments shown in FIGS. 1 and 2 the region of active gain is an annular disc. Other embodiments have the toroidal mirror located either upstream or downstream of the folding mirror configuration in which the region of active gain is bounded by conical surfaces. The maximum dimensions of the region of active gain are controlled by the superfluorescence phenomenon and although the folding mirror is shown with a base angle of 45°, the magnitude of the angle is increased or decreased depending on whether the toroidal mirror is upstream or downstream with respect to the position shown.

The unstable configuration shown in FIGS. 1 and 2 is a positive branch resonator which is confocal. Alternate embodiments include systems based on nonconfocal positive optics as well as negative branch resonators which have the optical focus occurring in the axial region 26.

Since the active gain medium is essentially an annular volume, the intracavity flux density is inversely proportional to the separation distance from the conical reflecting surface, thus, the gain medium is not as fully saturated at a distance far from the conical mirror as it is at a distance closer to the conical mirror. However, since the gain medium is an annulus, its volume increases as the distance from the conical mirror increases and this increased volume compensates for the reduction in flux due to the decrease in saturation in the gain medium. These factors combine to provide a power variation which increases with distance from the conical mirror. The effects of reduced flux density can be further minimized by increasing the diameter of the annulus and as long as the limits imposed by superfluorescence are not exceeded, the total volume of active gaim medium which is large can be accommodated in the resonator without incurring a large variation in flux density between the inner and outer diameters of the annulus.

The maximum power handling capability of the unstable toroidal resonator of the present invention is limited for all practical purposes by the power handling capabilities of the circular end mirror. The toroidal mirror has the largest surface area of any of the reflective surfaces and the power handling capability of this element is not a limiting factor since the large area experiences the lowest flux density of any of the reflective surfaces exposed to the laser radiation; however, the circular mirror has the incidence flux of highest density and this parameter controls the maximum power from an unstable resonator. The folding mirror experiences a flux density which is higher than that on the toroidal mirror and lower than that on the circular end mirror. Some practical problems can arise due to excessive heating in the vicinity of the apex of the folding mirror and therefore the apex is preferably rounded to avoid a sharp point.

Chemical lasers in general and combustion driven chemical lasers in particular have an inherent spatial gain variation which decreases rapidly in the direction of flow due to the short lifetimes of the active species involved. This phenomenon is actually used to advantage in the present invention by allowing the active species to travel in the flow direction 38 so that the highest gain occurs at the exit plane from the nozzle array where the surface of the folding mirror is greatest. The reflecting surface on this folding mirror decreases as the distance from the nozzle array increases, however, since the gain in the working medium is also decreasing, the net result promotes a near uniform optical flux on the surface of the deflecting cone.

In addition to transferring rays between the radial and axial regions, the conical folding mirror symmetrizes the radial profile with respect to both intensity and phase, and optically compensates for spatial gain variation in the flow direction. These functions are accomplished because the higher intensity portions of the radially propagating beam which occur on the upstream side of the beam are distributed along the base of the folding mirror cone where the reflective surface is greatest. The lower intensity portions of the radially propagating beam which occur on the downstream side are distributed along the upper area of the folding mirror where the reflective surface is a minimum. As a result the intensity profile of the beam is made more uniform in the axial region and in the near field. The phase of the resonating mode varies with distance from the nozzle array in the nonaxial region 28 and is made azimuthally symmetric in the axial region 26 as well as in the near field by the conical folding mirror 18. The symmetrizing of the phase and intensity profile of the output beam in the near field translates into a far field energy distribution which more closely resembles the distribution characteristic of a diffraction limited resonator.

The cross sectional curvature of the toroidal mirror is circular and has a geometrical axis of symmetry which must be made coincident with the downstream side of the resonant mode in the nonaxial region of the resonator represented by the ray trace line 42. The circular contour collimates the beam from the circular end mirror 20 which is divergent. Alternatively, the toroidal mirror contour can be convex and combined with a circular end mirror which is concave or both the toroidal and circular end mirrors made with concave or even nonspherical reflective surfaces such as an off-axis paraboloid.

Figure 3:
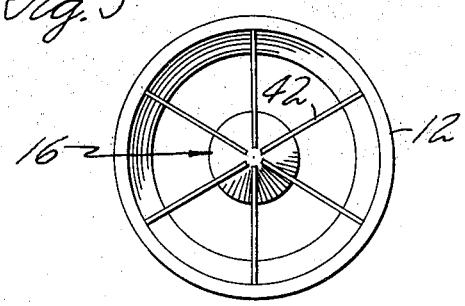
FIG. 3 is a simplified sketch of the nonaxial region of the resonator with radially extending fins.

In some embodiments the volume of active gain medium in the nonaxial region of the resonator is large enough to permit various parasitic modes involving multiple reflections off the folding mirror and superfluorescence in a direction transverse to the direction of gas flow 38 can occur. These parasitic modes are suppressed by locating radially extending fins 42 between the toroidal and folding mirrors as is shown in FIG. 3. The fins are typically sandblasted metal so that they present nonreflective surfaces to the gain medium. The fins do not interrupt the purely radial propagation while severely suppressing all azimuthally inclined propagation.

The unstable toroidal resonator produces an output beam of laser radiation which is circularly symmetric and at power levels which are higher than was achievable with previous techniques. The quality of the beam in the far field is significantly better than is possible with the toroidal resonator described by Casperson.

In implementing the present invention, steps must be taken to prevent the beam inside the resonator from passing through any substantial concentrations of depleted working medium. If the beam is allowed to pass through molecules of the working medium which have been reduced to their ground state, these molecules actually absorb energy and can lead to a substantial reduction in the power of the output beam from the resonator. Therefore, special design features such as those shown in FIG. 4 are provided to sweep the working medium out of the path of the resonant beam. The basic elements including the toroidal end mirror 12, the conical folding mirror 16 and the circular end mirror 20 are shown in the configuration previously described internal to a circular housing 44. The working medium which exits from the nozzle array passes through the nonaxial region 28 in the flow direction 38 and is gathered away from the axial region 26 by an inner wall 46 which completely encloses the circular end mirror. An aerodynamic window 48 between the nozzle array and the upstream end of the inner wall prevents the leakage of the working medium into the axial region while providing no obstruction to the radial propagation of the mode in the resonator. The apparatus is shown with helium cooling to the reflective surfaces of both the toroidal and conical mirror surfaces. The gas also provides a barrier to the reflective surfaces, protecting them from the corrosive effects of the working medium. Each of the mirrors forming the resonator is also cooled by water passing through internal passages in the mirrors.

Although this invention has been shown and described with respect to preferred embodiments thereof, it should be understood by those skilled in the art that various changes and omissions in the form and detail thereof may be made therein without departing from the spirit and scope of the invention.

Having thus described a typical embodiment of our invention, that which we claim as new and desire to secure by letters Patent of the United States is:

1. An unstable resonator comprising:
   an end mirror having a circular reflective surface which is symmetrically disposed about an optical axis passing essentially through the geometric center of the circular surface;
   a folding mirror having a conical reflective surface which is optically communicative with the circular end mirror and is symmetrically disposed about the optical axis and oriented with the cone apex toward the reflective surface; and
   an annular end mirror having a curved reflective surface which is optically communicative with and disposed symmetrically about the folding mirror.

2. An unstable resonator comprising:
   a first end mirror having a circular reflective surface which is symmetrically disposed about a centerline axis passing therethrough;
   a second end mirror having a toroidal reflective surface which is symmetrically disposed about the axis; and
   a folding mirror in the shape of a cone and having a conical reflective surface extending between the base and the apex of the cone, the reflective surface being optically communicative with the reflective surface of both the first and second end mirrors and disposed symmetrically about the centerline axis, the apex of the cone pointed toward and the base of the cone facing away from the first end mirror.

3. The invention according to claim 2 including further a plurality of fin elements which project radially from the centerline axis and extend between the conical reflective surface of the folding mirror and the reflective surface of the second end mirror.

4. The invention according to claim 2 including further a coupling mirror having a flat reflective surface which is annular and is symmetrically disposed about the centerline axis, the plane of the reflective surface being inclined with respect to the centerline axis.

5. The invention according to claim 4 including further a nozzle array arranged in a circular pattern extending between the second end mirror and the base of the folding mirror to provide gaseous working medium along the centerline axis between the folding and second end mirrors.

6. The invention according to claim 5 wherein the base angle of the cone forming the folding mirror is forty-five degrees.

7. The invention according to claim 6 wherein the reflective surface of the first end mirror is convex, the reflective surface of the second end mirror is concave, and the unstable resonator is confocal.

8. An unstable laser resonator comprising:
   an outer housing which is circular in cross section and symmetrically disposed about an optical axis which passes through the center of the cross section;
   a ring end mirror internal to the outer housing, the ring mirror having a concave reflective surface and being disposed symmetrically about the optical axis;
   gas distribution means extending across the opening through the center of the ring end mirror, the distribution means including a plurality of gas expansion nozzles to provide a flow of laser gain medium past the concave reflective surface;
   a conical reflective surface positioned on the optical axis to form a radial region for the propagation of laser radiation between the reflective surfaces of the conical and the ring mirrors;
   a centerline end mirror symmetrically disposed about the optical axis to form an axial region between the reflective surfaces of the centerline and conical mirrors;
   an inner housing which is circular in cross section and symmetrically disposed about the optical axis, the inner housing being concentric with the axial region and outer housing; and
   aerodynamic window means extending between the gas distribution means and the inner housing to prevent the leakage of laser gain medium into the axial region.

\* \* \* \* \*